United States Patent
Shiraishi et al.

(10) Patent No.: US 9,960,652 B2
(45) Date of Patent: May 1, 2018

(54) MOTOR

(71) Applicant: Nidec Corporation, Minami-ku, Kyoto (JP)

(72) Inventors: Takashi Shiraishi, Kyoto (JP); Takahiro Hiwa, Kyoto (JP); Shohei Osuga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 783 days.

(21) Appl. No.: 14/399,264

(22) PCT Filed: May 17, 2013

(86) PCT No.: PCT/JP2013/003159
§ 371 (c)(1),
(2) Date: Nov. 6, 2014

(87) PCT Pub. No.: WO2013/175749
PCT Pub. Date: Nov. 28, 2013

(65) Prior Publication Data
US 2015/0084460 A1  Mar. 26, 2015

(30) Foreign Application Priority Data
May 22, 2012 (JP) .................. 2012-116843

(51) Int. Cl.
*H02K 5/00* (2006.01)
*H02K 3/44* (2006.01)
(Continued)

(52) U.S. Cl.
CPC .............. *H02K 3/44* (2013.01); *H02K 3/28* (2013.01); *H02K 13/006* (2013.01); *H02K 5/00* (2013.01);
(Continued)

(58) Field of Classification Search
CPC ........ H02K 13/006; H02K 3/44; H02K 13/44; H02K 2205/09; H02K 5/10; H02K 5/12;
(Continued)

(56) References Cited

U.S. PATENT DOCUMENTS 4,945,270 A   7/1990  Okamoto
4,978,875 A *  12/1990  Okamoto ............... F02N 15/00
                                                             310/43
(Continued)

FOREIGN PATENT DOCUMENTS

JP   7-23961 U    5/1995
JP   9-261906 A   10/1997
(Continued)

OTHER PUBLICATIONS

Official Communication issued in International Patent Application No. PCT/JP2013/003159, dated Aug. 13, 2013.

*Primary Examiner* — Bernard Rojas
*Assistant Examiner* — Maged Almawri
(74) *Attorney, Agent, or Firm* — Keating & Bennett, LLP

(57) ABSTRACT

A motor includes a housing, a back cover, a brush card, a brush, and a connector member. The back cover includes a first rear wall portion and a first peripheral wall portion. The first peripheral wall portion includes a through-hole and a cut-out. The through-hole vertically penetrates through the first peripheral wall portion at or near a lower end portion of the first peripheral wall portion. The cut-out is disposed farther on an upper side than the through-hole. The connector member is fitted into the cut-out. An outer surface of the connector member is provided with a flow path groove that extends in both peripheral and axial directions. The motor includes a flow path surface on an inner surface of the back (Continued)

cover. The flow path surface continues from a portion that opposes the flow path groove on a lower side of the flow path groove to the through-hole.

13 Claims, 13 Drawing Sheets

(51) Int. Cl.
| | | |
|---|---|---|
| *H02K 13/00* | (2006.01) | |
| *H02K 3/28* | (2006.01) | |
| *H02K 5/128* | (2006.01) | |
| *H02K 5/14* | (2006.01) | |
| *H02K 5/132* | (2006.01) | |
| *H02K 5/04* | (2006.01) | |
| *H02K 5/12* | (2006.01) | |
| *H02K 5/10* | (2006.01) | |

(52) U.S. Cl.
CPC ............... *H02K 5/04* (2013.01); *H02K 5/10* (2013.01); *H02K 5/12* (2013.01); *H02K 5/128* (2013.01); *H02K 5/1285* (2013.01); *H02K 5/132* (2013.01); *H02K 5/14* (2013.01); *H02K 5/141* (2013.01); *H02K 5/143* (2013.01); *H02K 5/146* (2013.01); *H02K 2205/09* (2013.01)

(58) Field of Classification Search
CPC .... H02K 5/128; H02K 5/1282; H02K 5/1285; H02K 5/132; H02K 5/14; H02K 5/141; H02K 5/143; H02K 5/145; H02K 5/146
USPC .................. 310/88, 59, 62, 89, 239, 249, 71
See application file for complete search history.

(56) References Cited

U.S. PATENT DOCUMENTS

| | | | | |
|---|---|---|---|---|
| 5,010,265 | A * | 4/1991 | Tanaka | F02N 15/00 290/48 |
| 5,943,909 | A * | 8/1999 | Soh | F02N 15/00 123/179.25 |
| 6,448,676 | B1 * | 9/2002 | Kershaw | H02K 5/225 310/64 |
| 7,132,772 | B2 * | 11/2006 | Takeuchi | H02K 5/10 310/59 |
| 7,195,466 | B2 * | 3/2007 | Kobayashi | F02M 37/048 310/237 |
| 2004/0263009 | A1 | 12/2004 | Noda et al. | |
| 2006/0192449 | A1 * | 8/2006 | Noda | F04D 25/082 310/88 |
| 2009/0108687 | A1 * | 4/2009 | Kogure | H02K 5/10 310/71 |
| 2012/0104888 | A1 * | 5/2012 | Kuwada | H02K 5/10 310/89 |

FOREIGN PATENT DOCUMENTS

| | | |
|---|---|---|
| JP | 3051656 B2 | 6/2000 |
| JP | 2006-174589 A | 6/2006 |
| JP | 3971349 B2 | 9/2007 |
| JP | 2008-131791 A | 6/2008 |
| JP | 4473644 B2 | 6/2010 |
| JP | 4593832 B2 | 12/2010 |

* cited by examiner

[Fig. 1]
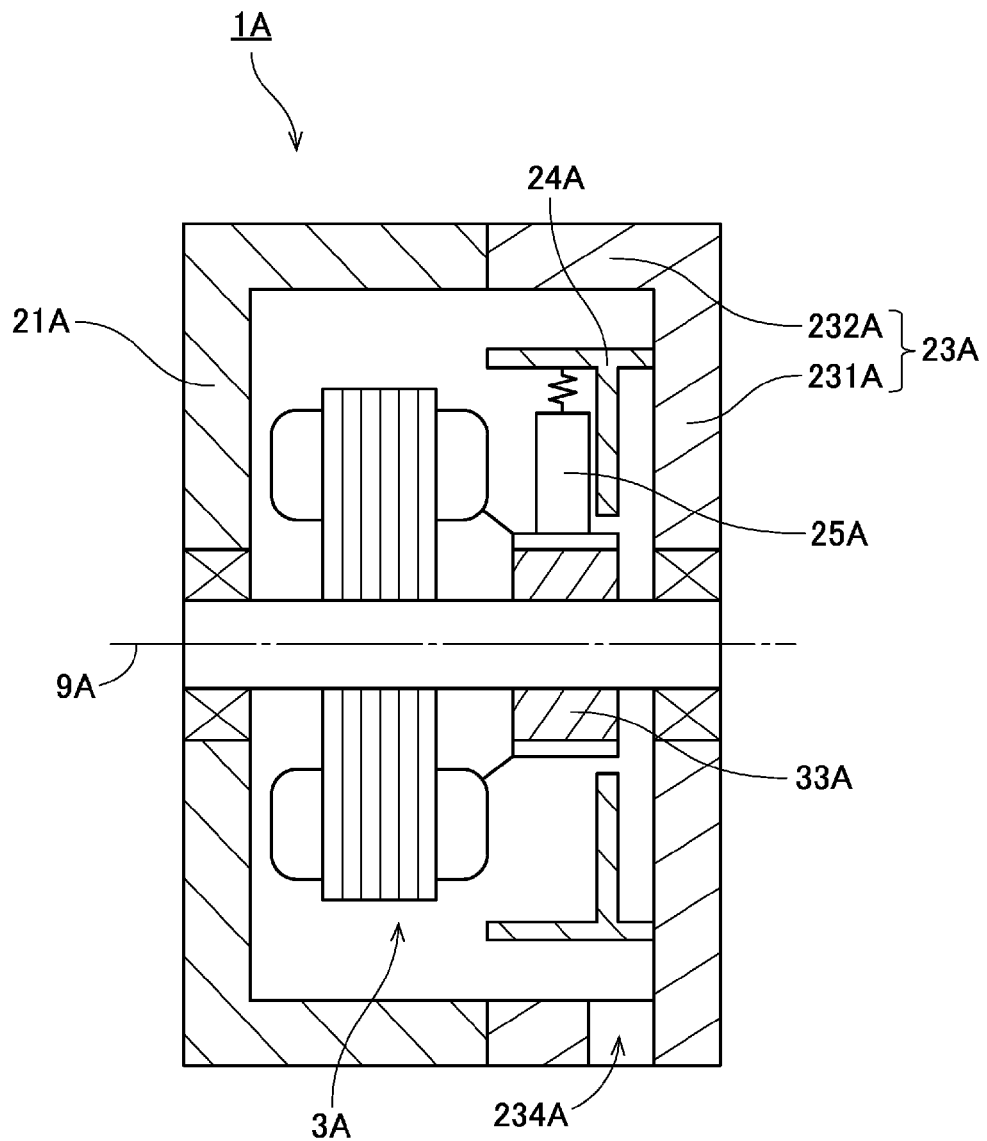

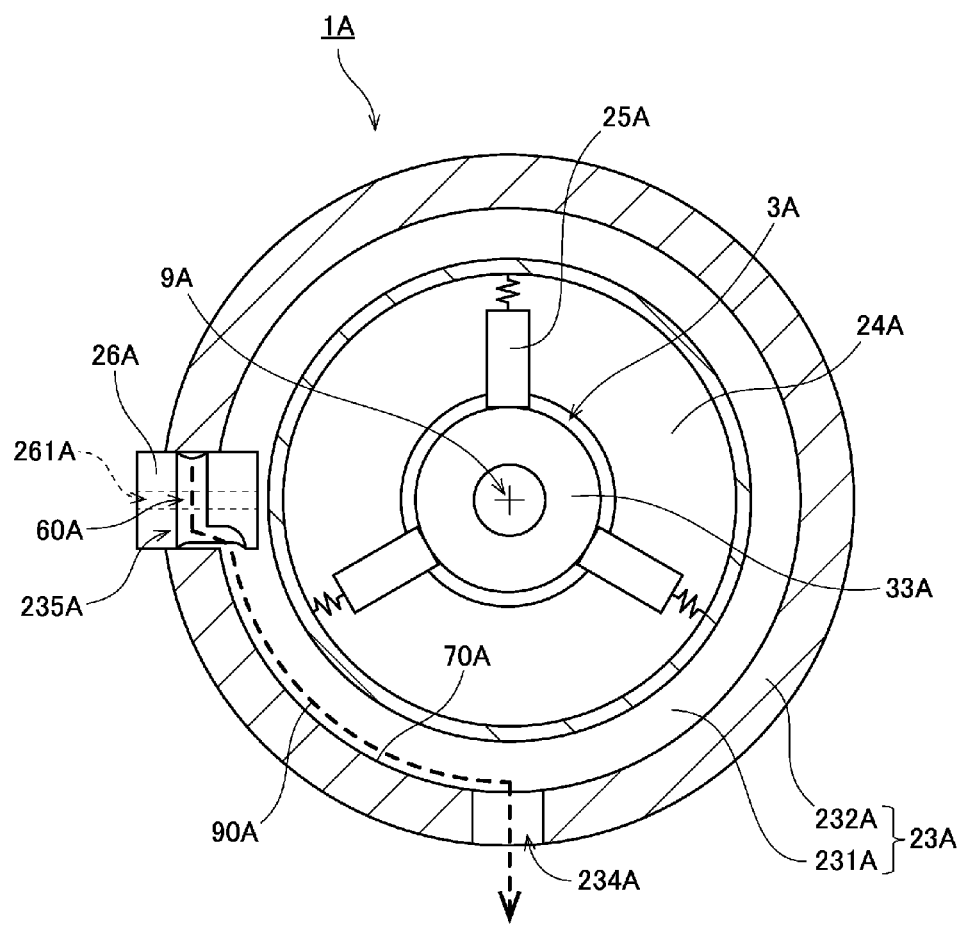
[Fig. 2]

[Fig. 3]
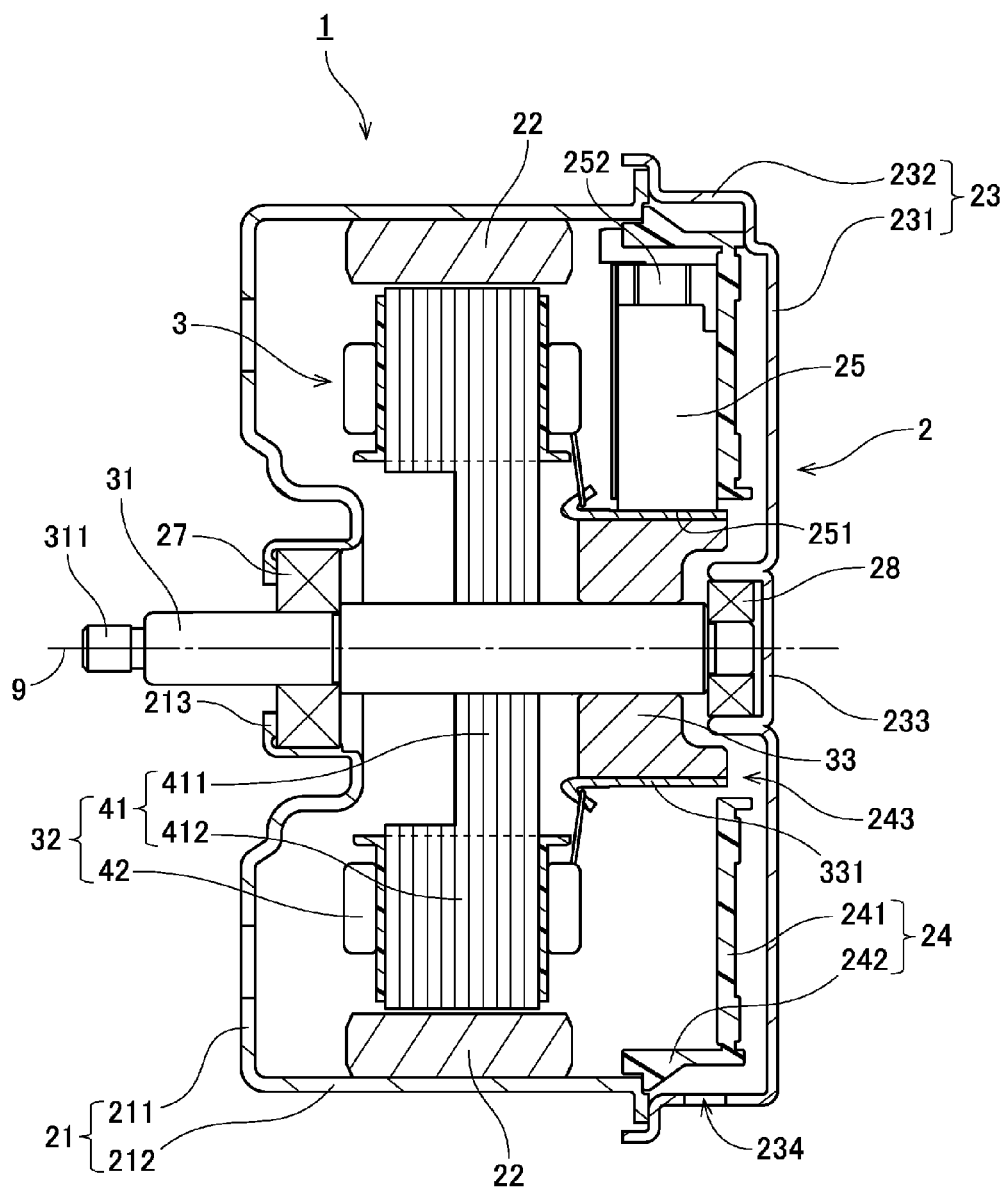

[Fig. 4]
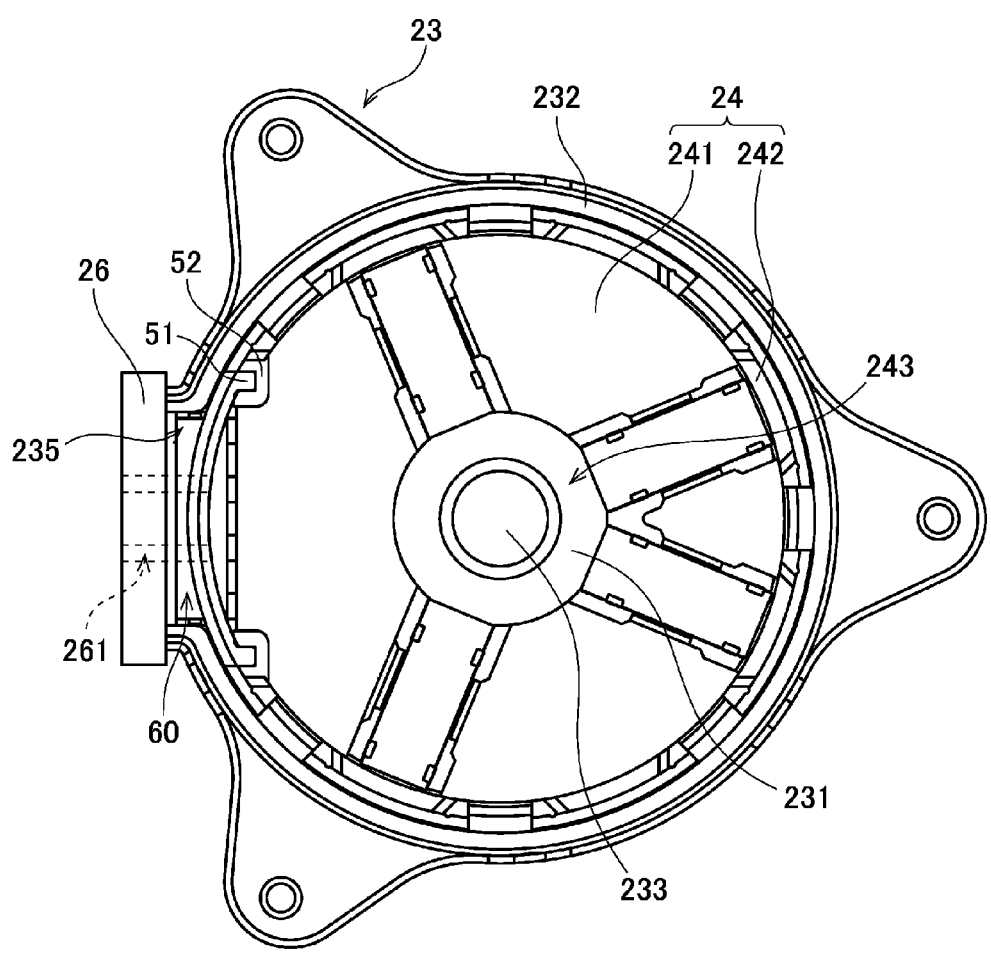

[Fig. 5]
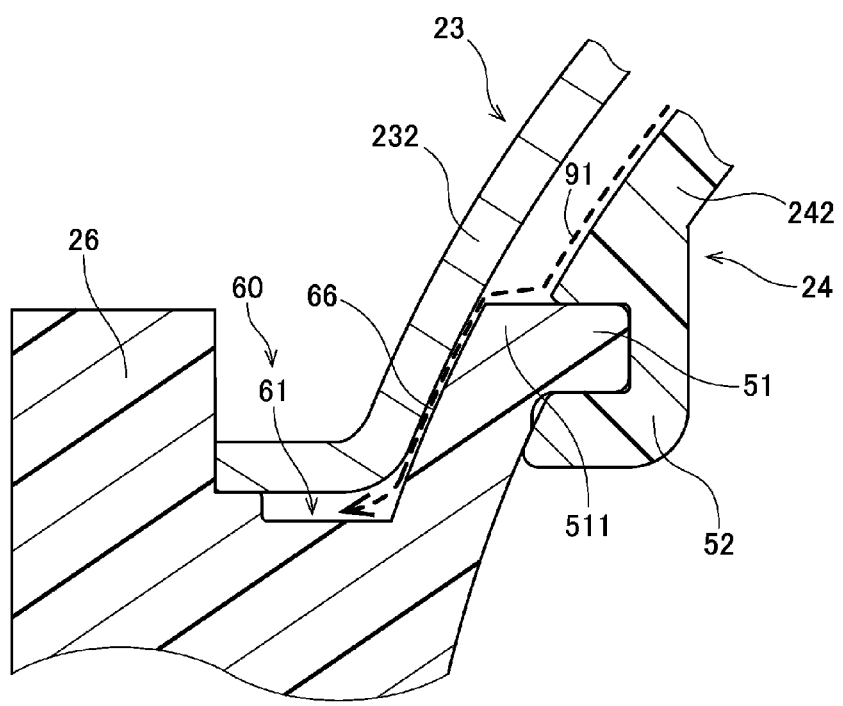

[Fig. 6]
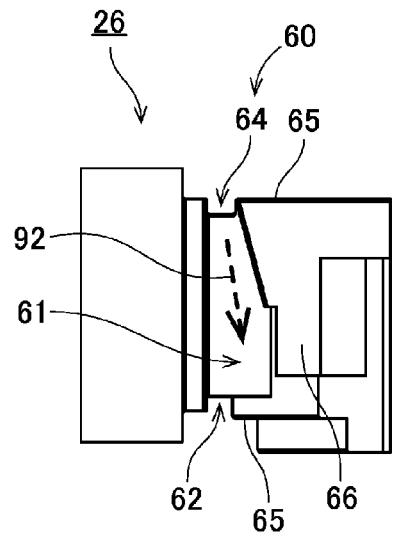
[Fig. 7]
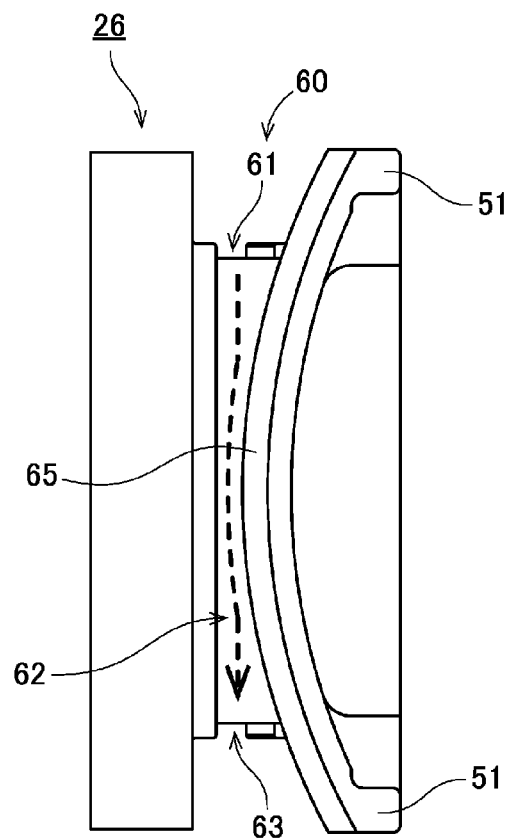

[Fig. 8]
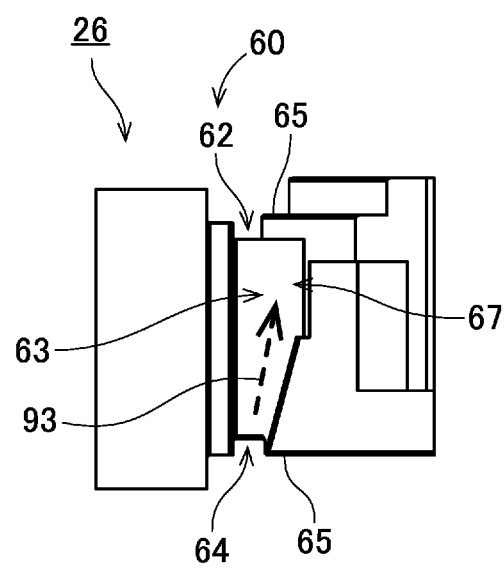

[Fig. 9]
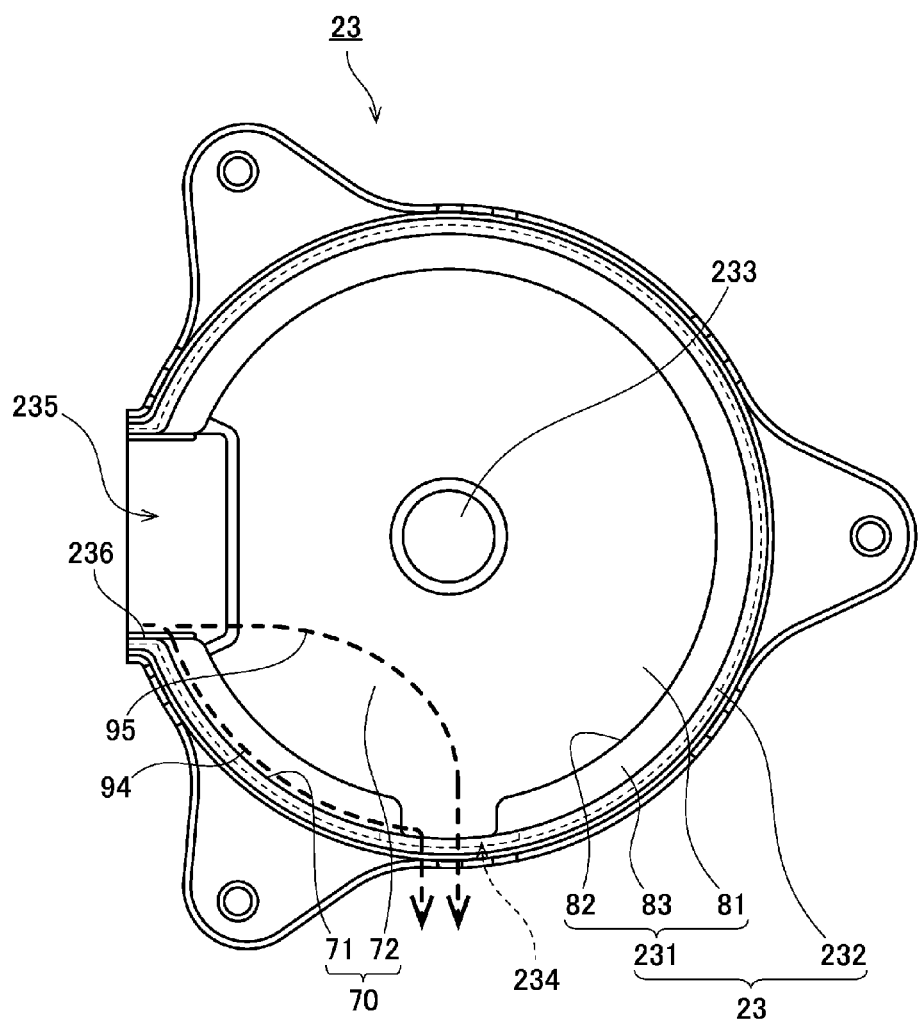

[Fig. 10]
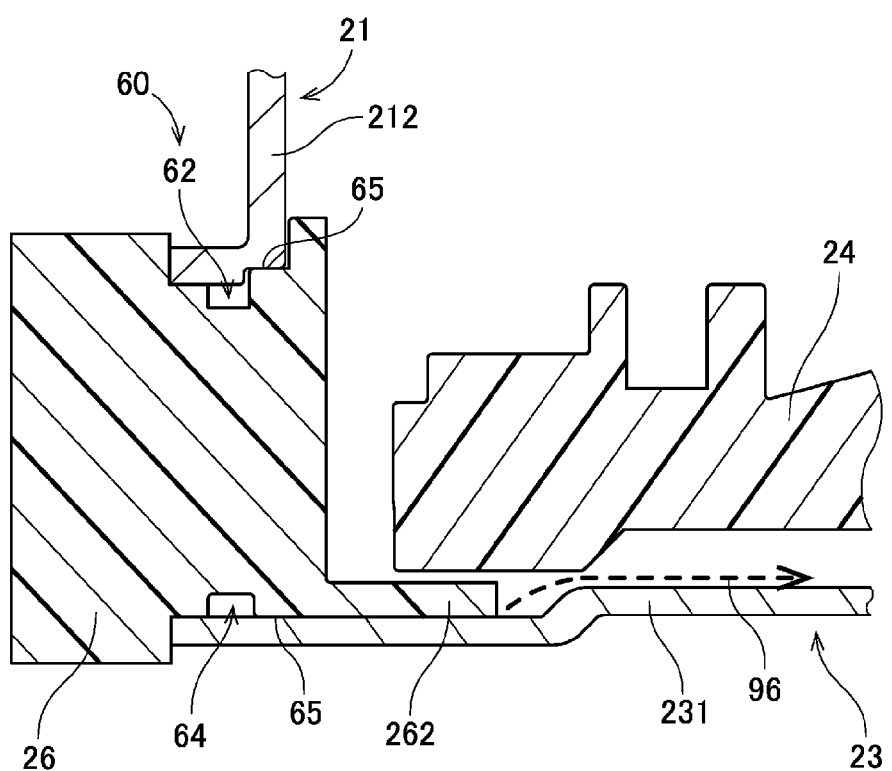

[Fig. 11]
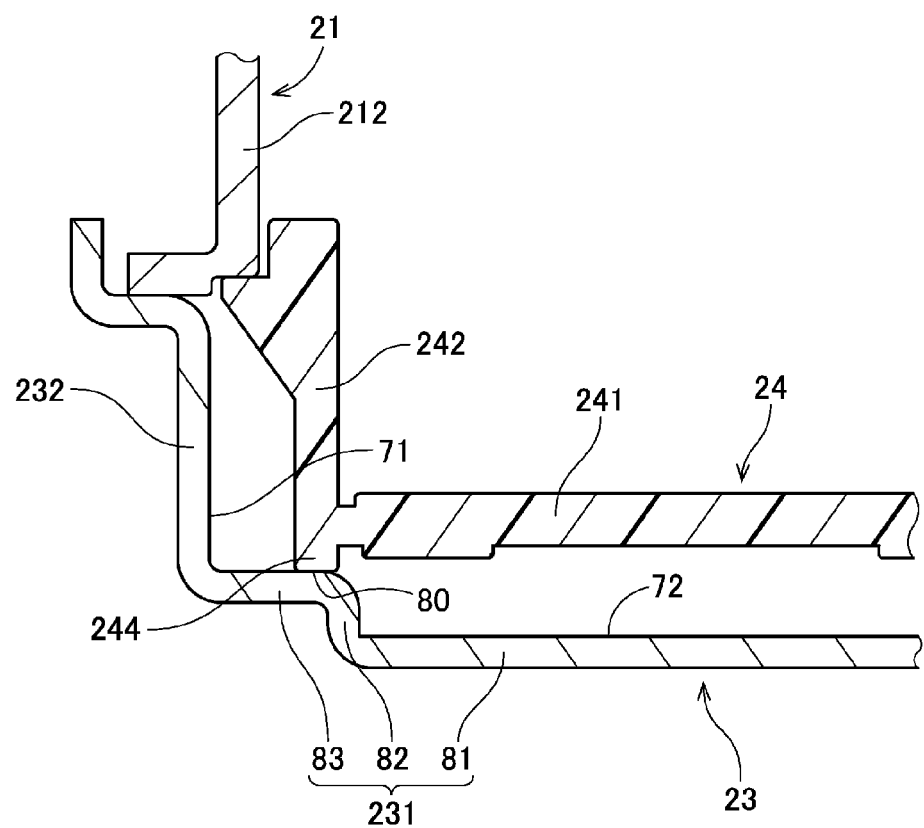

[Fig. 12]
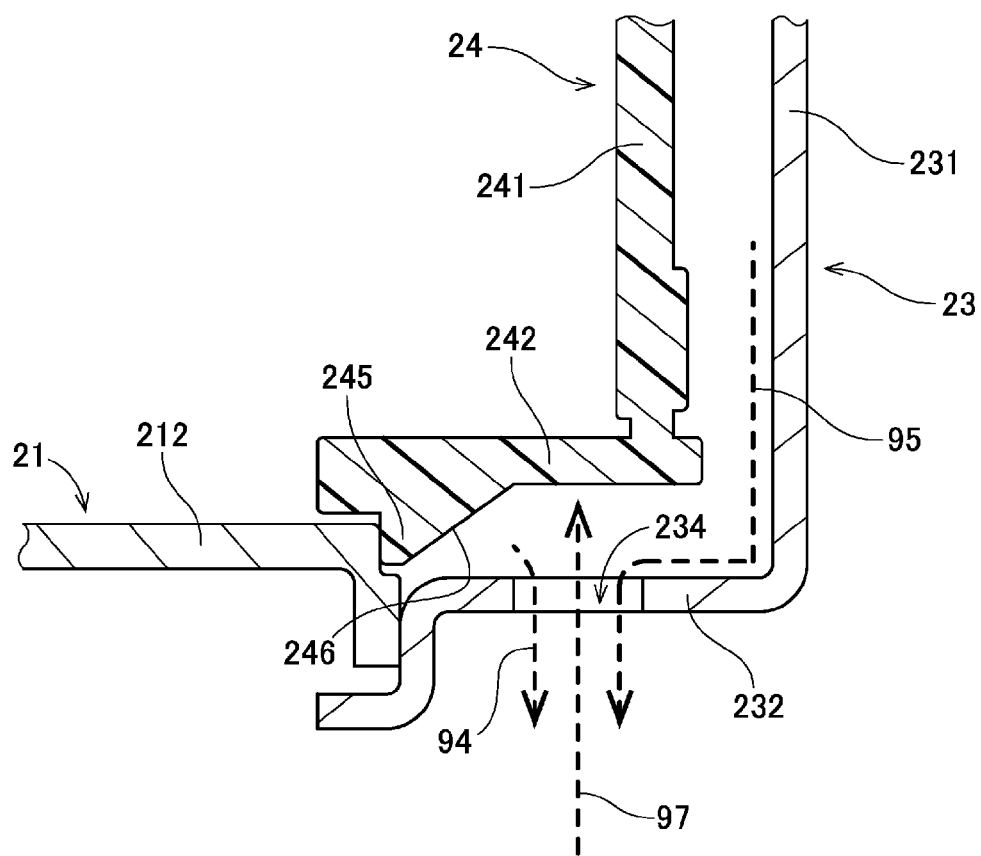

[Fig. 13]
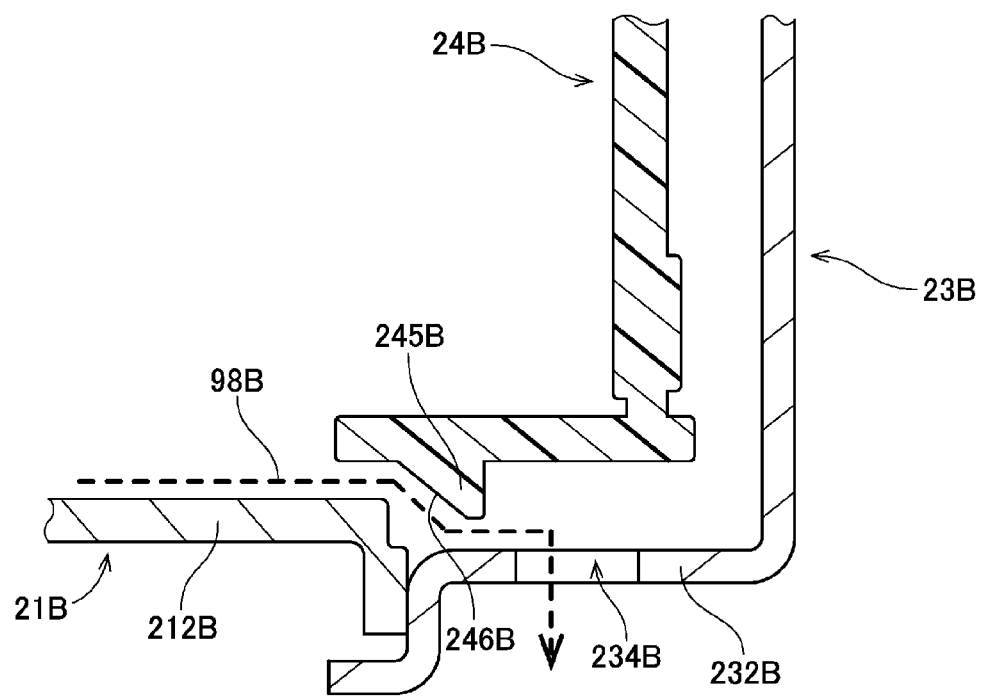

[Fig. 14]
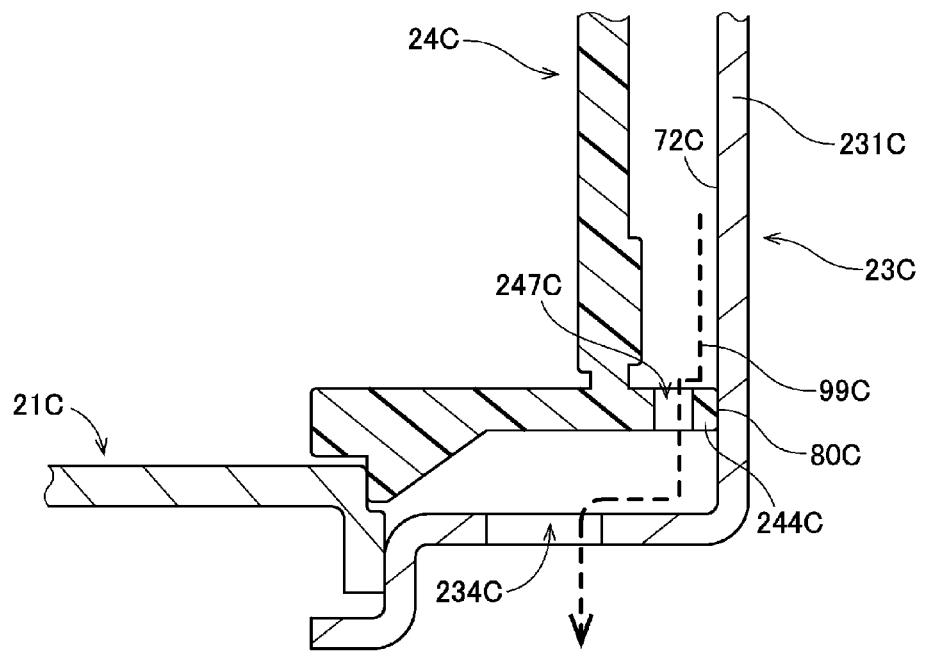

MOTOR

BACKGROUND OF THE INVENTION

1. Field of the Invention

The present invention relates to a motor.

2. Description of the Related Art

Hitherto, a motor having a brush is known. The structure of the motor having a brush is described, for example, in Japanese Patent No. 3971349. The motor in Japanese Patent No. 3971349 has a rotatable armature and a brush which comes into sliding contact with a commutator of the armature (Paragraphs [0018] and [0019] of Japanese Patent No. 3971349). In addition, the brush in Japanese Patent No. 3971349 is connected to an external power supply and supplies power to the armature via the commutator (Paragraph [0019] of Japanese Patent No. 3971349).

There may be a case where the motor having the brush is used in an environment in which liquid droplets are likely to be present, for example, the inside of a vehicle. In this case, it is preferable that liquid droplets be prevented from adhering to the brush, which is a conductor. In addition, the brush is electrically connected to the external power supply via lead wires. In addition, in a cover which accommodates the brush, a connector member for supporting the lead wires is mounted. Therefore, liquid droplets adhering to the periphery of the connector member require being discharged to the outside of the cover without reaching the brush.

However, when an O-ring or a gasket is provided in the periphery of the connector member in order to prevent infiltration of liquid droplets into the cover, the number of components of the motor increases. In addition, when the number of components of the motor increases, the manufacturing process of the motor becomes complex and the manufacturing cost of the motor also increases.

SUMMARY OF THE INVENTION

According to an exemplary preferred embodiment of the present invention, a motor includes a rotating portion, a housing, a back cover, a brush card, a brush, and a connector member. The rotating portion is supported to be rotatable centered on a center axis which extends horizontally or substantially horizontally from front to rear. The rotating portion includes a commutator. The housing is cup-shaped or substantially cup-shaped, which accommodates at least a portion of the rotating portion. The back cover is disposed in a rear side of the housing. The back cover is cup-shaped or substantially cup-shaped and, together with the housing, defines a casing. The brush card is disposed in the casing. The brush card widens in a direction perpendicular or substantially perpendicular to the center axis. The brush is disposed in a front side of the brush card. The brush comes into contact with the commutator. The connector member is fixed to the back cover in a radially outer side of the brush card. The back cover includes a first rear wall portion and a first circumferential wall portion. The first rear wall portion widens in the direction perpendicular or substantially perpendicular to the center axis in a rear side of the brush card. The first circumferential wall portion has a cylindrical or substantially cylindrical shape, which extends toward a front side from an outer circumferential portion of the first rear wall portion. The first circumferential wall portion includes a through-hole and a cut-out. The through-hole penetrates up-and-down through the first circumferential wall portion in a vicinity of a lower end portion of the first circumferential wall portion. The cut-out is disposed in an upper side than the through-hole. The connector member is fitted into the cut-out. The connector member includes a communication hole through which a lead wire passes. An outer surface of the connector member is provided with a flow path groove which extends in a circumferential direction and an axial direction. An inner surface of the back cover in the motor includes a flow path surface. The flow path surface continues from a portion which opposes the flow path groove in a lower side of the flow path groove to the through-hole.

According to various preferred embodiments of the present invention, liquid droplets adhering to the connector member flow down the flow path groove and the flow path surface and are discharged to the outside of the back cover through the through-hole. Therefore, the motor according to various preferred embodiments of the present invention significantly reduce or prevent adhesion of the liquid droplets to the brush without the need for an O-ring or a gasket as an essential component.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a longitudinal cross-sectional view of a motor according to a first preferred embodiment of the present invention.

FIG. 2 is a view of the inside of the motor according to the first preferred embodiment of the present invention, viewed from the front side.

FIG. 3 is a longitudinal cross-sectional view of a motor according to a second preferred embodiment of the present invention.

FIG. 4 is a view of a back cover, a brush card, and a connector member according to the second preferred embodiment of the present invention, viewed from the front side.

FIG. 5 is a partial longitudinal cross-sectional view of the back cover, the brush card, and the connector member according to the second preferred embodiment of the present invention.

FIG. 6 is a top view of the connector member according to the second preferred embodiment of the present invention.

FIG. 7 is a view of the connector member according to the second preferred embodiment of the present invention, viewed from the front side.

FIG. 8 is a bottom view of the connector member according to the second preferred embodiment of the present invention.

FIG. 9 is a view of the back cover according to the second preferred embodiment of the present invention, viewed from the front side.

FIG. 10 is a partial transverse cross-sectional view of a housing, the back cover, the brush card, and the connector member according to the second preferred embodiment of the present invention.

FIG. 11 is a partial cross-sectional view of the housing, the back cover, and the brush card according to the second preferred embodiment of the present invention.

FIG. 12 is a partial longitudinal cross-sectional view of the housing, the back cover, and the brush card according to the second preferred embodiment of the present invention.

FIG. 13 is a partial longitudinal cross-sectional view of a housing, a back cover, and a brush card according to a modification of a preferred embodiment of the present invention.

FIG. 14 is a partial longitudinal cross-sectional view of a housing, a back cover, and a brush card according to another modification of a preferred embodiment of the present invention.

DETAILED DESCRIPTION OF THE PREFERRED EMBODIMENTS

Hereinafter, exemplary preferred embodiments of the present invention will be described. In addition, in the present invention, a direction parallel or substantially parallel to the center axis of a motor is referred to as an "axial direction", a direction perpendicular or substantially perpendicular to the center axis of the motor is referred to as a "radial direction", and a direction along the arc about the center axis of the motor as the center is referred to as a "circumferential direction". In addition, in the present invention, shapes and positional relationships of portions are described assuming that the axial direction is a forward and rearward direction and a housing side with respect to a back cover is a forward direction. In addition, a "parallel direction" in the present invention includes both a parallel direction and a substantially parallel direction. In addition, a "perpendicular" in the present invention includes both a perpendicular or substantially perpendicular direction.

FIG. 1 is a longitudinal cross-sectional view of a motor 1A according to a first preferred embodiment. FIG. 2 is a view of the inside of the motor 1A viewed from the front side. As illustrated in FIGS. 1 and 2, the motor 1A preferably includes a rotating portion 3A, a housing 21A, a back cover 23A, a brush card 24A, a brush 25A, and a connector member 26A. The rotating portion 3A is supported to be rotatable centered on a center axis 9A which extends horizontally or substantially horizontally from the front to the rear. In addition, the rotating portion 3A includes a commutator 33A.

The housing 21A is preferably a cup-shaped or substantially cup-shaped member. At least a portion of the rotating portion 3A is accommodated in the housing 21A. The back cover 23A is preferably a cup-shaped or substantially cup-shaped member. The back cover 23A is disposed on the rear side of the housing 21A. The commutator 33A, the brush card 24A, and the brush 25A are disposed in a casing constituted by the housing 21A and the back cover 23A. The brush card 24A widens in a direction perpendicular or substantially perpendicular to the center axis 9A. In addition, the brush 25A is disposed on the front side of the brush card 24A. The brush 25A comes into contact with the commutator 33A.

The back cover 23A preferably includes a first rear wall portion 231A and a first circumferential wall portion 232A. The first rear wall portion 231A widens in the direction perpendicular or substantially perpendicular to the center axis 9A in the rear side of the brush card 24A. The first circumferential wall portion 232A extends in a cylindrical or substantially cylindrical shape toward the front side from the outer circumferential portion of the first rear wall portion 231A. In addition, the first circumferential wall portion 232A preferably includes a through-hole 234A and a cut-out 235A. As illustrated in FIGS. 1 and 2, the through-hole 234A penetrates in an up-and-down direction through the first circumferential wall portion 232A in the vicinity of the lower end portion of the first circumferential wall portion 232A. In addition, as illustrated in FIG. 2, the cut-out 235A is disposed higher up than the through-hole 234A.

The connector member 26A is fixed to the back cover 23A in the radially outer side of the brush card 24A. The connector member 26A is fitted into the cut-out 235A. In addition, the connector member 26A preferably includes a communication hole 261A through which lead wires pass.

As illustrated in FIG. 2, the connector member 26A preferably includes a flow path groove 60A. The flow path groove 60A circumferentially and axially extends in the outer surface of the connector member 26A. In addition, the inner surface of the back cover 23A includes a flow path surface 70A. The flow path surface 70A continues from a portion that opposes the flow path groove 60A in the lower side of the flow path groove 60A to the through-hole 234A.

Liquid droplets adhering to the connector member 26A flow down the flow path groove 60A and the flow path surface 70A as indicated by the broken line arrow 90A in FIG. 2 and are preferably discharged to the outside of the back cover 23A from the through-hole 234A. Therefore, the motor 1 significantly reduces or prevents the adhesion of liquid droplets to the brush 25A without the need for an O-ring, a gasket, etc.

Subsequently, a second preferred embodiment of the present invention will be described. FIG. 3 is a longitudinal cross-sectional view of a motor 1 according to a second preferred embodiment. The motor of this preferred embodiment is preferably mounted, for example, in a vehicle and is preferably used as a driving source of an engine cooling fan. As illustrated in FIG. 3, the motor 1 has a stationary portion 2 and a rotating portion 3. The stationary portion 2 is fixed to a frame body of an apparatus which is a driving object. The rotating portion 3 is supported to be rotatable with respect to the stationary portion 2.

The stationary portion 2 of this preferred embodiment preferably includes a housing 21, a plurality of magnets 22, a back cover 23, a brush card 24, a plurality of brushes 25, a connector member 26, a front bearing portion 27, and a rear bearing portion 28. FIG. 4 is a view of the back cover 23, the brush card 24, and the connector member 26 viewed from the front side. The following description will be provided appropriately with reference to FIG. 4 together with FIG. 3.

The housing 21 is preferably a cup-shaped or substantially cup-shaped member which is opened toward the rear side. At least a portion of the rotating portion 3 is accommodated in the housing 21. The housing 21 is preferably made of, for example, a metal such as a galvanized steel sheet. However, another material such as, for example, a resin may also be used as the material of the housing 21.

As illustrated in FIG. 3, the housing 21 preferably includes a front wall portion 211 and a front circumferential wall portion 212. The front wall portion 211 widens in a disk shape or substantially in a disk shape in a direction perpendicular or substantially perpendicular to a center axis 9 in front of an armature 32, which will be described later. At the center of the front wall portion 211, a front bearing holding portion 213 which holds the front bearing portion 27 is provided. The front circumferential wall portion 212 widens in a cylindrical or substantially cylindrical shape toward the rear side from the outer circumferential portion of the front wall portion 211.

The plurality of magnets 22 are fixed to the inner circumferential surface of the front circumferential wall portion 212. The radially inner surfaces of the plurality of magnets 22 are magnetic pole surfaces which oppose the armature 32 which will be described later in the radial direction. In the plurality of magnets 22, N-pole magnetic pole surfaces and S-pole magnetic pole surfaces are alternately arranged. The plurality of magnets 22 are preferably arranged at equal or substantially equal intervals in the circumferential direction. In addition, instead of the plurality of magnets 22, a single annular magnet in which the N poles and S poles are alternately magnetized in the circumferential direction may also be used.

The back cover 23 is preferably a cup-shaped or substantially cup-shaped member which is opened toward the front side. The back cover 23 is disposed in the rear side of the housing 21. The back cover 23 is preferably made of, for example, a metal such as a galvanized steel sheet. However, another material such as a resin may also be used as the material of the back cover 23. The plurality of magnets 22, the brush card 24, the plurality of brushes 25, the armature 32 (which will be described later), and the commutator 33 (which will be described later) are all preferably accommodated in a casing defined by the housing 21 and the back cover 23.

As illustrated in FIGS. 3 and 4, the back cover 23 includes a first rear wall portion 231 and a first circumferential wall portion 232. The first rear wall portion 231 widens, in the rear side of the brush card 24, in a disk shape or substantially in a disk shape in a direction perpendicular or substantially perpendicular to a center axis 9. At the center of the first rear wall portion 231, a rear bearing holding portion 233 that holds the rear bearing portion 28 is provided. The first circumferential wall portion 232 widens in a cylindrical or substantially cylindrical shape toward the front side from the outer circumferential portion of the first rear wall portion 231.

The first circumferential wall portion 232 preferably includes a through-hole 234 and a cut-out 235. As illustrated in FIG. 3, the through-hole 234 penetrates up-and-down through the first circumferential wall portion 232 in the vicinity of the lower end portion of the first circumferential wall portion 232. In addition, as illustrated in FIG. 4, the cut-out 235 radially penetrates through the first circumferential wall portion 232 in the upper side of the through-hole 234. In this preferred embodiment, the cut-out 235 is disposed at a position having the same or substantially the same height as that of the center axis 9, that is, at a position separated from the through-hole 234 by about 90 degrees with respect to the center axis 9.

The brush card 24 is disposed in the front side of the first rear wall portion 231 and in the radially inner side of the first circumferential wall portion 232. A resin which is an electrical insulator is preferably used as the material of the brush card 24, for example. As illustrated in FIGS. 3 and 4, the brush card 24 includes a second rear wall portion 241 and a second circumferential wall portion 242. The second rear wall portion 241 widens, in the front side of the first rear wall portion 231, in a disk shape or substantially in a disk shape in the direction perpendicular or substantially perpendicular to the center axis 9. The center of the second rear wall portion 241 preferably includes a circular hole 243 in which the rear bearing holding portion 233 or the commutator 33 may be arranged, which will be described later. The second circumferential wall portion 242 extends in a cylindrical or substantially cylindrical shape toward the front side from the outer circumferential portion of the second rear wall portion 241.

The plurality of brushes 25 are held by the brush card 24. Each of the brushes 25 is an electrical conductor that comes into contact with the commutator 33, which will be described later. As illustrated in FIG. 3, in this preferred embodiment, the plurality of brushes 25 are disposed on the front side of the second rear wall portion 241 and in the radially inner side of the second circumferential wall portion 242. Accordingly, liquid droplets are significantly reduced or prevented from adhering to the brush 25. Each of the brushes 25 includes a contact surface 251 which comes into contact with a segment 331 of the commutator 33. In addition, each of the brushes 25 is preferably biased toward the radially inner side by a spring 252 interposed between the brush 25 and the second circumferential wall portion 242. Accordingly, the contact surface 251 is pressed against the segment 331. As a result, the brush 25 and the segment 331 are electrically connected to each other.

The connector member 26 is a member which supports lead wires that connect the brushes 25 to an external power supply. As the material of the connector member 26, for example, a resin which is an insulator is used. The connector member 26 is disposed in the radially outer side of the brush card 24. In addition, the connector member 26 is preferably fixed to the back cover 23 in a state of being fitted into the cut-out 235 of the back cover 23.

In addition, the connector member 26 includes a single or a plurality of communication holes 261. The one or more communication holes 261 penetrate through the connector member 26 in the radial direction. The lead wires that extend from the external power source are connected to the brushes 25 through the communication hole 261 of the connector member 26.

The front bearing portion 27 and the rear bearing portion 28 are mechanisms that rotatably support a shaft 31 of the rotating portion 3. Ball bearings which rotate outer races and inner races relatively with respect to each other via spheres are preferably used as the front bearing portion 27 and the rear bearing portion 28 of this preferred embodiment, for example. The outer race of the front bearing portion 27 is fixed to the front bearing holding portion 213 of the housing 21. The outer race of the rear bearing portion 28 is fixed to the rear bearing holding portion 233 of the back cover 23. In addition, the inner races of both the front bearing portion 27 and the rear bearing portion 28 are fixed to the shaft 31. Here, instead of the ball bearings, other types of bearings such as, for example, sliding bearings or fluid bearings may also be used if so desired.

The rotating portion 3 of this preferred embodiment includes the shaft 31, the armature 32, and the commutator 33.

The shaft 31 is disposed along the center axis 9 that horizontally or substantially horizontally extends from the front to the rear. The shaft 31 is supported by the front bearing portion 27 and the rear bearing portion 28 and rotates centered on the center axis 9. In addition, the shaft 31 preferably includes a head portion 311 that protrudes more forward than the front wall portion 211 of the housing 21. A component which is a driving object (for example, an impeller) is mounted to the head portion 311.

The armature 32 is disposed in the radially inner side of the plurality of magnets 22. The armature 32 preferably includes an armature core 41 and a coil 42. The armature core 41 is preferably made of, for example, laminated steel sheets. The armature core 41 includes an annular core back 411 and a plurality of teeth 412 which protrude radially outward from the core back 411. The shaft 31 is preferably press-fitted, for example, into the radial inside of the core back 411. The plurality of teeth 412 are arranged at equal or substantially equal intervals in the circumferential direction. The coil 42 is constituted by conducting wires wound around the teeth 412.

The commutator 33 is in the rear side of the armature 32 and is fixed to the shaft 31. On the outer circumferential surface of the commutator 33, a plurality of the conductive segments 331 are preferably provided at equal intervals in the circumferential direction. In addition, a conducting wire that is led out from the coil 42 is electrically connected to each of the segments 331.

A driving electrical current supplied from the external power supply flows to the coil 42 through the lead wires, the brushes 25, and the segments 331. When the driving current is supplied to the coil 42, magnetic flux is generated in the teeth 412. In addition, a circumferential torque is generated by magnetic attraction or magnetic repulsion between the teeth 412 and the magnets 22. As a result, the rotating portion 3 rotates centered on the center axis 9 with respect to the stationary portion 2. In addition, when the commutator 33 rotates, the contact surface 251 of each of the brushes 25 sequentially comes into contact with the plurality of segments 331. Accordingly, the driving current is sequentially supplied to the plurality of coils 42. As a result, the rotating portion 3 continuously rotates.

Subsequently, a drainage structure of the motor 1 according to this preferred embodiment will be described.

FIG. 5 is a partial longitudinal cross-sectional view of the back cover 23, the brush card 24, and the connector member 26. As illustrated in FIGS. 4 and 5, the connector member 26 preferably includes a pair of protruding portions 51. The pair of protruding portions 51 protrude radially inward from both end portions in the circumferential direction of the connector member 26. On the other hand, the second circumferential wall portion 242 of the brush card 24 preferably includes a pair of recessed portions 52. The pair of protruding portions 51 are respectively fitted into the pair of recessed portions 52.

As in FIG. 5, in this preferred embodiment, at least one of both end surfaces in the circumferential direction of the protruding portion 51 and the end surface in the radially inner side of the protruding portion 51 come into contact with the surface of the recessed portion 52. That is, the protruding portion 51 and the recessed portion 52 come into contact with each other at a plurality of surfaces which are continuous. In addition, both end surfaces in the axial direction of the protruding portion 51 come into contact with the housing 21 or the back cover 23. Accordingly, infiltration of liquid droplets into the radial inside from the boundary portion between the connector member 26 and the brush card 24 is significantly reduced or prevented.

FIG. 6 is a top view of the connector member 26. FIG. 7 is a view of the connector member 26 viewed from the front side. FIG. 8 is a bottom view of the connector member 26. As illustrated in FIGS. 6 to 8, a flow path groove 60 is preferably provided on the outer surface of the connector member 26. When liquid droplets such as, for example, water droplets adhere to the outer surface of the connector member 26, the liquid droplets are collected in the flow path groove 60 due to gravity and surface tension.

The flow path groove 60 preferably includes an upper axial groove 61, a front circumferential groove 62, a lower axial groove 63, and a rear circumferential groove 64. As illustrated in FIGS. 6 and 7, the upper axial groove 61 axially extends in the upper surface of the connector member 26. As illustrated in FIGS. 6 to 8, the front circumferential groove 62 circumferentially and vertically extends in the surface of the front side of the connector member 26. As illustrated in FIGS. 7 and 8, the lower axial groove 63 axially extends in the lower surface of the connector member 26. In addition, as illustrated in FIGS. 6 and 8, the rear circumferential groove 64 circumferentially and vertically extends in the surface of the rear side of the connector member 26.

Liquid droplets collected in the flow path groove 60 flow toward the lower axial groove 63 due to gravity. Particularly, in this preferred embodiment, the upper axial groove 61, the front circumferential groove 62, the lower axial groove 63, and the rear circumferential groove 64 are preferably connected in an annular shape. That is, the flow path groove 60 is connected in the outer surface of the connector member 26 in an annular shape. Therefore, the liquid droplets collected in the upper axial groove 61 reach the lower axial groove 63 even when flowing to any of the front circumferential groove 62 and the rear circumferential groove 64. Accordingly, the liquid droplets are efficiently collected in the lower axial groove 63.

In addition, as illustrated in FIG. 5, in this preferred embodiment, a base end portion 511 of the protruding portion 51 of the connector member 26 is positioned in the radially outer side than the outer circumferential surface of the second circumferential wall portion 242 of the brush card 24. Accordingly, liquid droplets are significantly reduced or prevented from staying in the boundary between the second circumferential wall portion 242 and the protruding portion 51. Liquid droplets adhering to the outer circumferential surface of the second circumferential wall portion 242 flow toward the upper axial groove 61 along the base end portion 511 of the protruding portion 51 as indicated by the broken line arrow 91 in FIG. 5.

In addition, as illustrated in FIGS. 6 to 8, the connector member 26 of this preferred embodiment preferably includes an inner dike surface 65 in the radially inner side of the flow path groove 60. The inner dike surface 65 widens radially inward from the edge of the radially inner side of the flow path groove 60. In addition, the inner dike surface 65 comes into contact with the housing 21 or the back cover 23. Accordingly, infiltration of liquid droplets into the radially inner side from the flow path groove 60 is significantly reduced or prevented.

In addition, as illustrated in FIGS. 5 and 6, the connector member 26 of this preferred embodiment preferably include a tapered surface 66 in the radially inner side of the upper axial groove 61. The tapered surface 66 is inclined so that the height thereof increases as it heads toward the radially inner side from the edge of the radially inner side of the upper axial groove 61. Therefore, even if liquid droplets collected in the upper axial groove 61 overflow from the upper axial groove 61, the liquid droplets are returned to the upper axial groove 61 by the tapered surface 66. Accordingly, infiltration of liquid droplets into the radially inner side is preferably further significantly reduced or prevented.

As illustrated in FIG. 5, the tapered surface 66 is disposed farther towards the radially inner side than the first circumferential wall portion 232 of the back cover 23. Therefore, liquid droplets that flow toward the base end portion 511 of the protruding portion 51 from the outer circumferential surface of the second circumferential wall portion 242 are collected in the upper axial groove 61 through a space between the first circumferential wall portion 232 and the tapered surface 66 as indicated by the broken line arrow 91 in FIG. 5.

In addition, as illustrated in FIG. 6, the upper axial groove 61 in this preferred embodiment preferably includes a portion of which the width in the radial direction increases as it heads toward the front side. The flow resistance of the portion increases as it heads toward the rear. Therefore, the liquid droplets collected in the upper axial groove 61 are preferably guided to the front side as indicated by the broken line arrow 92 in FIG. 6. In addition, liquid droplets that flow toward the front side from the upper axial groove 61 flow to the lower axial groove 63 through the front circumferential groove 62.

In addition, as illustrated in FIG. 8, the connector member 26 of this preferred embodiment includes a guide groove 67 in the radially inner side of the lower axial groove 63. The guide groove 67 preferably extends radially inward from the lower axial groove 63. In addition, the lower axial groove 63 of this preferred embodiment includes a portion of which the width in the radial direction increases as it heads toward the guide groove 67. The flow resistance of the portion reduces as it heads toward the guide groove 67. Therefore, the liquid droplets collected in the lower axial groove 63 are preferably guided to the guide groove 67 side as indicated by the broken line arrow 93 in FIG. 8.

FIG. 9 is a view of the back cover 23 viewed from the front side. The cut-out 235 of the back cover 23 preferably includes an opposing surface 236 positioned in the lower side of the connector member 26. The opposing surface 236 vertically opposes the guide groove 67 of the connector member. In addition, the inner surface of the back cover 23 includes a flow path surface 70 which continues from the opposing surface 236 to the through-hole 234. Liquid droplets collected in the flow path groove 60 of the connector member 26 flow to the opposing surface 236 from the guide groove 67. Accordingly, the liquid droplets flow down the flow path surface 70 to the through-hole 234 as indicated by the broken line arrows 94 and 95 in FIG. 9 and are discharged to the outside of the back cover 23.

In this way, in the motor 1 of this preferred embodiment of the present invention, liquid droplets adhering to the connector member 26 flow down the flow path groove 60 and the flow path surface 70 and are discharged to the outside of the back cover 23 through the through-hole 234. Therefore, the motor 1 significantly reduces or prevents the adhesion of liquid droplets to the brush 25 without the need for an O-ring, a gasket, etc. As a result, the motor 1 is prevented from having an increased number of components and the manufacturing cost thereof is also significantly reduced.

FIG. 10 is a partial transverse cross-sectional view of the housing 21, the back cover 23, the brush card 24, and the connector member 26. As illustrated in FIG. 10, the connector member 26 of this preferred embodiment preferably includes a plate-shaped protruding portion 262 in the radially inner side of the rear circumferential groove 64. The plate-shaped protruding portion 262 extends radially inward along the surface in the front side of the first rear wall portion 231. The surface in the rear side of the plate-shaped protruding portion 262 comes into contact with the surface in the front side of the first rear wall portion 231. In addition, the end edge portion in the radially inner side of the plate-shaped protruding portion 262 is preferably positioned farther radially inward than the end edge portion in the radially outer side of the brush card 24.

Therefore, even if liquid droplets infiltrate radially inward from a space between the first rear wall portion 231 and the plate-shaped protruding portion 262, the liquid droplets flow along the surface in the front side of the first rear wall portion 231 as indicated by the broken line arrow 96 in FIG. 10. Accordingly, liquid droplets are preferably prevented from infiltrating into the front side of the brush card 24. As a result, adhesion of the liquid droplets to the brush 25 is preferably further significantly reduced or prevented.

FIGS. 11 and 12 are partial cross-sectional views of the housing 21, the back cover 23, and the brush card 24. FIG. 12 illustrates a longitudinal cross-section including the through-hole 234. FIG. 11 illustrates a cross-section at a different position in the circumferential direction from that of FIG. 12. As illustrated in FIG. 11, the first rear wall portion 231 of the back cover 23 preferably includes an inner rear wall portion 81, an inner circumferential wall portion 82, and an outer rear wall portion 83. The inner rear wall portion 81 widens in the direction perpendicular or substantially perpendicular to the center axis 9 in the rear side having a gap from the second rear wall portion 241 of the brush card. The inner circumferential wall portion 82 extends in a cylindrical or substantially cylindrical shape toward the front side from the outer circumferential portion of the inner rear wall portion 81. The outer rear wall portion 83 widens radially outward from the front end portion of the inner circumferential wall portion 82. The end edge portion in the radially outer side of the outer rear wall portion 83 is connected to the rear end portion of the first circumferential wall portion 232.

In addition, the brush card 24 preferably includes a leg portion 244 of an annular or substantially annular shape. The leg portion 244 extends toward the rear side from the outer circumferential portion of the second rear wall portion 241. In addition, in this preferred embodiment of the present invention, the outer rear wall portion 83 of the back cover 23 and the leg portion 244 of the brush card 24 preferably come into contact with each other at an annular or substantially annular contact portion 80. That is, the back cover 23 or the brush card 24 includes the annular or substantially annular contact portion 80. The contact portion 80 is positioned in the radially inner side including a gap from the inner circumferential surface of the first circumferential wall portion 232.

As illustrated in FIGS. 9 and 11, the flow path surface of the back cover 23 preferably includes a first flow path surface 71 and a second flow path surface 72. The first flow path surface 71 is positioned farther radially outward than the contact portion 80. In addition, the first flow path surface 71 belongs to the inner circumferential surface of the first circumferential wall portion 232 and the surface in the front side of the outer rear wall portion 83. The second flow path surface 72 is positioned farther towards the radially inner side than the contact portion 80. The second flow path surface 72 corresponds to the surface on the front side of the inner rear wall portion 81 and the inner circumferential surface of the inner circumferential wall portion 82.

Liquid droplets which have infiltrated between the first circumferential wall portion 232 and the contact portion 80 flow down the first flow path surface 71 to the through-hole 234 as indicated by the broken line arrow 94 in FIGS. 9 and 12. In addition, liquid droplets which have infiltrated into the radially inner side than the contact portion 80 flow down the second flow path surface 72 to the through-hole 234 as indicated by the broken line arrow 95 in FIGS. 9 and 12. In this way, the motor 1 of this preferred embodiment discharges liquid droplets infiltrated into the back cover 23 through two paths. That is, the motor 1 discharges liquid droplets that are present in any of the radially outer side and the radially inner side of the contact portion 80 to the outside of the back cover 23 through the through-hole 234. Therefore, the motor 1 efficiently discharges the liquid droplets from the inside of the back cover 23. As a result, the motor 1 significantly reduces or prevents the adhesion of liquid droplets to the brush 25.

In addition, as illustrated in FIG. 9, the inner circumferential wall portion 82 and the outer rear wall portion 83 are preferably not provided at a position that overlaps with the through-hole 234 in the radial direction. Therefore, as illustrated in FIG. 12, the contact portion 80 is interrupted at the position that overlaps with the through-hole 234 in the radial direction. Therefore, liquid droplets that flow down the second flow path surface 72 flow to the through-hole 234 through the portion where the contact portion 80 is interrupted. Particularly, in this preferred embodiment, as in FIG. 9, the surface in the front side of the inner rear wall portion 81 is preferably a flat surface without stepped portions. Therefore, the motor 1 causes liquid droplets to flow to the through-hole 234 more efficiently through the second flow path surface 72.

Liquid droplets discharged from the through-hole 234 are not only the liquid droplets that are guided to the back cover 23 through the flow path groove 60 of the connector member 26. For example, liquid droplets which have infiltrated through a through-hole provided in the housing 21 or liquid droplets which have infiltrated from the boundary portion between the housing 21 and the back cover 23 also flow down the first flow path surface 71 and the second flow path surface 72 and are discharged to the outside of the back cover 23 through the through-hole 234.

In addition, as illustrated in FIG. 11, in this preferred embodiment of the present invention, the inner circumferential surface of the first circumferential wall portion 232 of the back cover 23 and the outer circumferential surface of the second circumferential wall portion 242 of the brush card 24 oppose each other via a gap in the radial direction. Accordingly, movement of liquid droplets from the first flow path surface 71 toward the brush 25 is preferably further significantly reduced or prevented.

In addition, as illustrated in FIG. 11, in this preferred embodiment, the surface in the front side of the first rear wall portion 231 of the back cover 23 and the surface in the rear side of the second rear wall portion 241 of the brush card 24 oppose each other via a gap in the axial direction. Accordingly, movement of liquid droplets from the second flow path surface 72 to the brush 25 is preferably further significantly reduced or prevented. In this preferred embodiment, the gap in the axial direction is realized by allowing the outer rear wall portion 83 of the back cover 23 and the leg portion 244 of the brush card 24 to come into contact with each other. However, one of the outer rear wall portion 83 and the leg portion 244 may also be omitted if so desired.

In addition, the motor 1 of this preferred embodiment brings cooling air into the housing 21 and the back cover 23 when driving. Specifically, as indicated by the broken line arrow 97 in FIG. 12, the motor 1 causes gas to flow into the back cover 23 through the through-hole 234. The inflow of the gas occurs due to the rotation of the rotating portion 3. The brush 25 and the coil 42 are cooled by the gas.

Here, in this preferred embodiment of the present invention, the front end portion of the second circumferential wall portion 242 of the brush card 24 is positioned in the more front side than the through-hole 234. Therefore, the gas indicated by the arrow 97 is preferably prevented from being directly blown to the radial inside of the second circumferential wall portion 242. Therefore, even though liquid droplets are mixed with the gas indicated by the arrow 97, infiltration of the liquid droplets to the radially inner side than the second circumferential wall portion 242 is preferably significantly reduced or prevented.

In addition, as illustrated in FIG. 12, the brush card 24 of this preferred embodiment preferably includes an overhang portion 245. The overhang portion 245 protrudes radially outward from the outer circumferential surface of the second circumferential wall portion 242. In addition, the overhang portion 245 is positioned more towards a front side than the rear end portion of the through-hole 234. Accordingly, inflow of the gas indicated by the arrow 97 toward the front side is preferably further significantly reduced or prevented. Particularly, in this preferred embodiment, the radially outer surface of the overhang portion 245 is an inclined surface 246 which is displaced forward as it heads radially outward. In addition, the surface in the front side of the overhang portion 245 comes into contact with the rear end portion of the housing 21. Accordingly, inflow of the gas to the front side is further significantly reduced or prevented.

While exemplary preferred embodiments of the present invention have been described above, the present invention is not limited to the preferred embodiments described above.

FIG. 13 is a partial longitudinal cross-sectional view of a housing 21B, a back cover 23B, and a brush card 24B according to a modified preferred embodiment of the present invention. In the preferred embodiment of FIG. 13, a gap in the radial direction is preferably interposed between an overhang portion 245B and the inner circumferential surface of a first circumferential wall portion 232B or the inner circumferential surface of a front circumferential wall portion 212B. In this manner, as indicated by the arrow 98B in FIG. 13, liquid droplets which have infiltrated the housing 21B flow down the inner circumferential surface of the front circumferential wall portion 212B and the inner circumferential wall surface of the first circumferential wall portion 232B and are discharged to the outside of the back cover 23B through a through-hole 234B.

Particularly, in the preferred embodiment of FIG. 13, the surface in the front side of the overhang portion 245B is preferably an inclined surface 246B which is displaced toward the rear side as it heads radially outwards. Therefore, in the radially outer side of the overhang portion 245B, liquid droplets are guided toward the through-hole 234B more efficiently.

FIG. 14 is a partial longitudinal cross-sectional view of a housing 21C, a back cover 23C, and a brush card 24C according to another modified preferred embodiment. In the preferred embodiment of FIG. 14, a contact portion 80C between the back cover 23C and the brush card 24C is preferably not interrupted at a position that overlaps with a through-hole 234C in the radial direction. That is, even at the position that overlaps with the through-hole 234C in the radial direction, a first rear wall portion 231C of the back cover 23C and a leg portion 244C of the brush card 24C come into contact with each other.

However, in the preferred embodiment of FIG. 14, at a position that overlaps with the through-hole 234C in the radial direction, the leg portion 244C of the brush card 24C preferably includes a flow path hole 247C that penetrates farther from the radially inner side to the radially outer side than the contact portion 80C. Therefore, liquid droplets, as indicated by the arrow 99C in FIG. 14, liquid droplets which have infiltrated the housing 21C flow down a second flow path surface 72C toward the through-hole 234C through the flow path hole 247C. In addition, the leg portion 244C may also be provided with a cut-out instead of the flow path hole 247C.

The motors according to various preferred embodiments of the present invention may be, for example, a motor configured to rotate an in-vehicle fan or may also be a motor used for other purposes. For example, the motors according to various preferred embodiments of the present invention may also be used as a driving source of power steering of a vehicle. In addition, the motors according to various preferred embodiments of the present invention may also be mounted in home appliances, office automation equipment, medical equipment, and the like to generate various types of driving forces.

However, the preferred embodiments of the present invention are particularly useful for a motor used in an environment in which liquid droplets are likely to be present, for example. Therefore, various preferred embodiments of the present invention are particularly useful to a motor mounted in a transportation machine such as a car, or a fan motor configured to cool a server provided outdoors, a router, a communication base, a switch device, or the like.

The number of through-holes provided in the back cover may be one as in the above-described preferred embodiments, or may also be two or more. In addition, the position of the connector member may not necessarily be the position that is separated from the through-hole by about 90 degrees with respect to the center axis 9. In addition, detailed shapes of the members may also be different from the shapes illustrated in the drawings of the present application. In addition, the drainage structure of various preferred embodiments of the present invention may also be used in combination with a seal member such as an O-ring or a gasket.

In addition, the elements that appear in the above-described preferred embodiments and the modified examples may also be appropriately combined in a range in which there is no contradiction.

The above-described preferred embodiments and the modified examples may be used for a motor.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
   a rotating portion which includes a commutator and is supported to be rotatably centered on a center axis which extends horizontally or substantially horizontally from front to rear;
   a cup-shaped or substantially cup-shaped housing which accommodates at least a portion of the rotating portion;
   a cup-shaped or substantially cup-shaped back cover which is disposed in a rear side of the housing, and, together with the housing, defines a casing;
   a brush card which is disposed in the casing and widens in a direction perpendicular or substantially perpendicular to the center axis;
   a brush which is disposed in a front side of the brush card and comes into contact with the commutator;
   a connector member which is fixed to the back cover in a radially outer side of the brush card; wherein
   the back cover includes:
      a first rear wall portion which widens in the direction perpendicular or substantially perpendicular to the center axis in a rear side of the brush card; and
      a first circumferential wall portion of a cylindrical or substantially cylindrical shape, which extends toward a front side from an outer circumferential portion of the first rear wall portion;
   the first circumferential wall portion includes:
      a through-hole which penetrates up-and-down through the first circumferential wall portion in a vicinity of a lower end portion of the first circumferential wall portion; and
      a cut-out which is disposed in an upper side than the through-hole;
   the connector member is fitted into the cut-out and includes a communication hole through which a lead wire passes;
   an outer surface of the connector member is provided with a flow path groove which extends in a circumferential direction and an axial direction; and
   an inner surface of the back cover includes a flow path surface which continues from a portion which opposes the flow path groove in a lower side of the flow path groove to the through-hole.

2. The motor according to claim 1, wherein the flow path groove is connected in the outer surface of the connector member in an annular or substantially annular shape.

3. The motor according to claim 1, wherein
   the connector member includes an inner dike surface which widens radially inward from an edge on in radially inner side the flow path groove; and
   the inner dike surface, and the housing or the back cover come into contact with each other.

4. The motor according to claim 1, wherein
   the connector member includes a plate-shaped protruding portion which extends radially inward along a surface in a front side of the first rear wall portion; and
   an end edge portion in a radially inner side of the plate-shaped protruding portion is positioned farther towards a radially inner side than an end edge portion in a radially outer side of the brush card.

5. The motor according to claim 1, wherein
   an inner circumferential surface of the first circumferential wall portion opposes the brush card via a gap in a radial direction; and
   the flow path surface includes the inner circumferential surface of the first circumferential wall portion.

6. The motor according to claim 1, wherein
   a surface in the front side of the first rear wall portion opposes the brush card in the axial direction via a gap; and
   the flow path surface includes the surface in the front side of the first rear wall portion.

7. The motor according to claim 1, wherein
   the flow path groove includes an upper axial groove which extends in the axial direction in an upper surface of the connector member; and
   the connector member includes a tapered surface which is inclined so that a height thereof increases from an edge on a radially inner side of the upper axial groove toward the radially inner side.

8. The motor according to claim 7, wherein a width in a radial direction of the upper axial groove increases towards the front side.

9. The motor according to claim 1, wherein the flow path groove includes:
   a lower axial groove which extends in the axial direction in a lower surface of the connector member; and
   a guide groove which extends radially inward from the lower axial groove; and
   the guide groove and the flow path surface vertically oppose each other.

10. The motor according to claim 9, wherein a width in the radial direction of the lower axial groove increases toward the guide groove.

11. The motor according to claim 1, wherein the brush card includes:
   a second rear wall portion disposed in the front side of the first rear wall portion; and
   a second circumferential wall portion of a cylindrical or substantially cylindrical shape, which extends toward a front side from an outer circumferential portion of the second rear wall portion; and
   the brush is disposed in a front side of the second rear wall portion and a radially inner side of the second circumferential wall portion.

12. The motor according to claim 11, wherein
   the connector member includes a pair of protruding portions which protrude radially inward from both end portions in the circumferential direction thereof;
   the second circumferential wall portion includes a pair of recessed portions into which the pair of protruding portions are fitted; and
   a surface of the protruding portion and a surface of the recessed portion come into contact with each other.

13. The motor according to claim 12, wherein a base end portion of the protruding portion is positioned in a radially outer side than an outer circumferential surface of the second circumferential wall portion.

* * * * *